March 28, 1967     G. A. WIMBERLEY     3,311,334
SUPPORT FOR UNATTENDED FISHING GEAR
Filed May 31, 1966
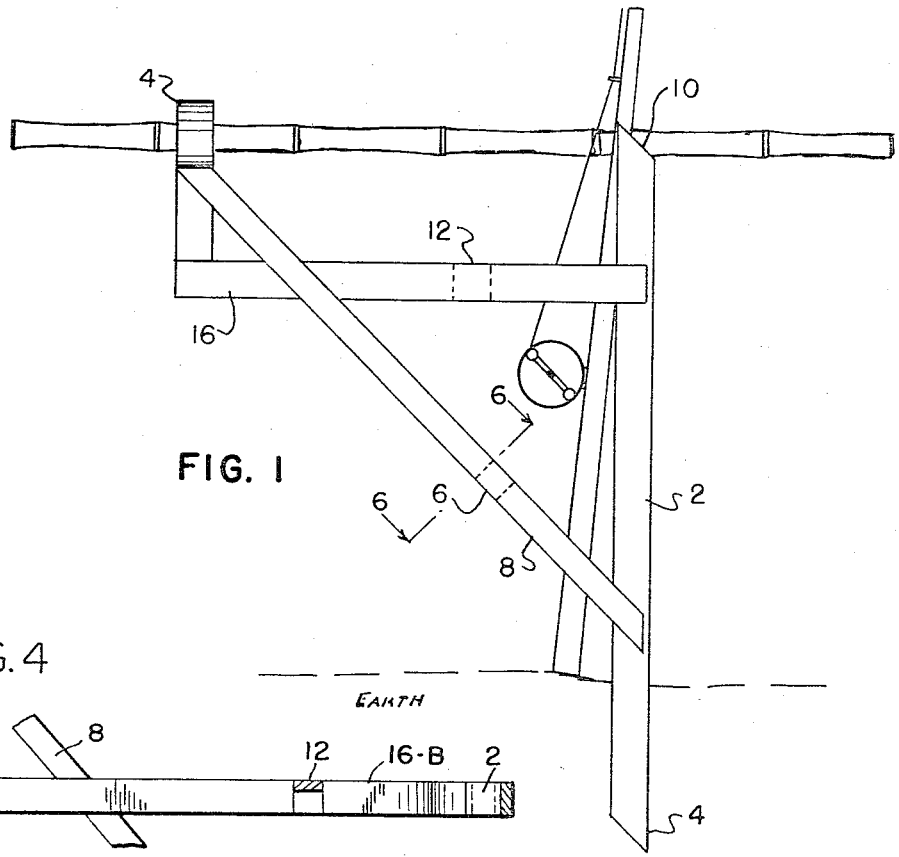
FIG. 1
FIG. 4
FIG. 2
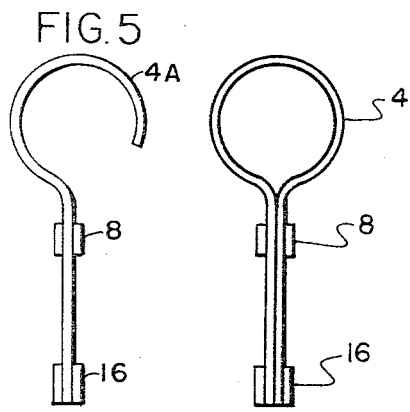
FIG. 5
FIG. 3
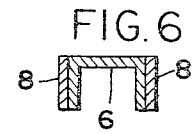
FIG. 6
*INVENTOR.*
GLENN A. WIMBERLEY
BY
ATTORNEY

United States Patent Office 3,311,334
Patented Mar. 28, 1967

3,311,334
SUPPORT FOR UNATTENDED FISHING GEAR
Glenn Adron Wimberley, 1019 Usener St.,
Houston, Tex. 77009
Filed May 31, 1966, Ser. No. 554,055
9 Claims. (Cl. 248—44)

This invention relates to apparatus for catching fish, and more particularly relates to apparatus for holding one or more unattended fishing poles or rods.

It is well known that many lakes and streams are relatively quiet or slow moving with respect to currents and tidal flows. It is also common practice among those who habitually fish such relatively quiet waters, to insert the butt ends of their fishing poles and casting rods into earth, so that they may then leave such poles and rods unattended for indefinite periods of time. Accordingly, it is well known among those who habitually engage in this type of fishing activity, for sport as well as for profit, to erect several rods or poles in such a manner in order to improve their chances of capturing fish. Furthermore, it is also well known among surf fishermen who operate in salt waters, to similarly erect and leave unattended one or more fishing rods or poles, especially during those periods when the ocean tides are ebbing rather than rising.

The simplest way of arranging an unattended fishing rod or pole is to imbed it in the earth. Not only is this technique undesirable in that it tends to soil or damage the rod, it is also quite undependable since it may be dragged free of the earth and pulled into the water if a fish happens to be caught. Consequently, more elaborate means have been devised, such as a joint of tubing mounted on a spike, wherein the spike is thrust into the earth and the fishing rod is then set into the tubing. Such a device may be more securely mounted in the earth, but it has the disadvantage of holding the fishing rod upright and thus is completely unsuited to locations such as the edge of a cliff-like bank of a lake or river.

These disadvantages of the prior art are overcome with the present invention and means is provided herewith for more securely supporting one or more fishing rods or poles in a more secure manner in almost any location. The advantages of the present invention are preferably attained by apparatus having a vertical main support member having an angle cross section and having its upper end beveled to form a notch. A horizontal support brace is further provided which is attached at one end to the main support member near but spaced from the notched end, and a ring or retaining member is also mounted at the other end in substantial alignment with the notch so as to support a horizontally-mounted fishing pole. The horizontal support brace is further modified, as will hereinafter be explained, to retain a second or third (or more) fishing pole or rod in substantial vertical arrangement.

Accordingly, it is an object of the present invention to provide new and novel apparatus for securely holding and retaining a horizontally-positioned and unattended fishing pole or rod.

It is a further object of the present invention to provide new and novel apparatus for securely holding and retaining a vertically-positioned and unattended fishing pole or rod.

It is another object of the present invention to provide new and novel apparatus for securely holding and retaining two or more unattended fishing poles or rods.

It is a specific object of the present invention to provide new and novel apparatus for supporting an unattended fishing rod, said apparatus comprising an angular shaped vertical support member having one beveled end adapted to be driven into the surface of the earth and having another beveled end forming a notch, a horizontal support member perpendicularly attached at one end to said vertical support member, and a retaining member perpendicularly attached at one end to the other end of said horizontal support member and having its other end in substantial alignment with the said beveled end of said vertical support member forming a notch.

These and other objects and features of the present invention will become apparent from the following description, wherein reference is made to the figures of the accompanying drawing.

In the drawing:

FIGURE 1 is a pictorial side view of one embodiment of the present invention, wherein apparatus is mounted in the earth to simultaneously support both a vertically-positioned and a horizontally-positioned fishing pole without the necessity of attendance.

FIGURE 2 is a top view of the main components of the apparatus depicted in FIGURE 1.

FIGURE 3 is a rear view of a particular component depicted in FIGURES 1 and 2.

FIGURE 4 is a pictorial representation, partly in cross section, of a portion of the apparatus depicted in FIGURES 1 and 2.

FIGURE 5 is a pictorial representation of a modified form of the apparatus depicted in FIGURE 3.

FIGURE 6 is a cross-sectional representation of a portion of the apparatus depicted in FIGURE 1.

Referring now to FIGURE 1, there may be seen a vertical support member 2 preferably formed of angle iron or aluminum, which has an angle-shaped top end 10 and bottom end 4. The bottom end 4 may be slanted in either direction, since it is only necessary that a sharp point be provided to facilitate thrusting the vertical support member 2 into the earth. However, it is preferable, as will hereinafter be explained, that the top end 10 be slanted upwardly from the apex or spine of the angle iron member 2.

As may be seen in FIGURES 1, 2 and 4, there is a horizontal support member 16 composed of two straps 16A and 16B which are each fastened at one end to the angle sides of the vertical support member 2 near its upper end 10. Mounted at and between and joining the opposite ends of the straps 16A and 16B is a ring member 4 which is preferably fashioned of a joint of strap metal having its ends arranged adjacent each other, and having its middle section formed into a loop. As may be seen in FIGURE 3, the ends of the ring member 4 are preferably disposed between and adjacent the ends of the straps 16A and 16B, and as seen in FIGURE 1, the ring member 4 is further preferably arranged so that its loop is held substantially in horizontal alignment with the top end 10 of the vertical support member 2. This ring member 4 is as preferably supported by a brace member 8 which is attached at one end to the vertical support member 2 near but not at its bottom end 4, and at the other end to the ring member 4 near its loop.

As may be seen in FIGURES 1, 2 and 4, the two straps 16A and 16B forming the horizontal support member 16 are preferably held apart near the vertical support member 2 by a U-shaped brace 12. The brace member 8, which may also be formed of two straps like the horizontal support member 16, is also preferably provided with a U-shaped brace 6 as more particularly depicted in FIGURE 6.

Referring again to FIGURE 1, it may be seen how the apparatus there depicted has been arranged so as to support a fishing rod of any type in either a vertical or a horizontal position, or to support two fishing rods or poles where one is substantially vertically supported and where the other is horizontally supported. As depicted, the vertical support member 2 has been inserted into the earth a distance sufficient to support the apparatus securely, but preferably not so deeply that the lower end of the brace member 8 is also thrust into the earth. In this manner, the apparatus will conveniently but securely support a vertically-disposed fishing rod so that its butt end can rest on the ground a slight distance away from the vertical support member 2, and so that it can lean against and inside the upper end 10 of the vertical support member 2. Arranged in this manner, a fishing rod will not ordinarily fall away from the vertical support member 2, although, as depicted in FIGURE 2, the straps 16A and 16B of the horizontal support member 16 should be spaced far enough apart so that the vertically-arranged fishing rod can easily and quickly be removed in the event a fish is caught. Nevertheless, in the rare event when the fishing rod is accidentally knocked backward away from the vertical support member 2, the U-shaped braces 6 and 12 will keep it from falling over completely.

Referring again to FIGURE 1, it may also be seen how a fishing rod or pole may be mounted horizontally in an unattended manner. More particularly, it may be seen how the butt or shank end of the horizontally-held pole is inserted into and through the loop of the ring member 4 any suitable distance, and how the rest of the pole (or rod) is placed in the V-shaped notch of the upper end 10 of the vertical support member 2.

As will be generally known among those familiar with catching fish with unattended fishing rods and poles, an unattended pole is presently almost never arranged in a horizontal manner or position because a hooked fish can most easily dismount or disengage a horizontally-arranged pole from its mounting. However, with the present invention a horizontally-mounted pole is just as secure as a vertically-mounted pole or rod, since the inside edges of the V-notch at the upper end 10, of the vertical support member 2, tend to grip the pole and to prevent any horizontal movement thereof. On the other hand, the horizontally-arranged pole can be easily and quickly removed from the depicted apparatus, in the event a fish is caught, by simply lifting it up from the upper end 10 of the vertical support member 2, and by pulling it out of the ring member 4. In this respect, the ring member 4 serves to retain the horizontally-arranged pole in position in the event its line end (not depicted) is pulled downward by a fish or other agency.

Although the apparatus depicted in FIGURE 1 is primarily intended to provide support for a single fishing rod in either a vertical or horizontal position, it may be seen how two poles or rods can be supported without foregoing any of the advantages of the present invention. In this respect, it should be noted that, for example, more than one rod or pole may be vertically supported provided there is sufficient spacing between straps 16A and 16B in the region between the vertical support member 2 and the U-brace 12.

It should be further noted that the apparatus depicted in FIGURE 1 is particularly designed to be easily inserted or thrust into the earth. Not only is the lower end 4 of the vertical support member 2 fashioned into a point, but the horizontal support member 16 functions as a handle for pushing the vertical support member 2 into the earth. In other words, the apparatus may be driven into the earth as if it were a pickaxe, or the user may simply drive it down by pressing his foot against the upper surface of the U-bracket 12.

Many modifications and variations may obviously be made in the apparatus described herein and depicted in the accompanying drawings, without departing from the basic concept of the present invention. For example, the apparatus is preferably made of heavy gauge structural aluminum, but it may also be made of structural iron or steel, wood, or even plastic, provided the material used gives strength and durability to the apparatus. Moreover the ring member 4 depicted in FIGURE 3 may be formed in the manner of a hook 4A as depicted in FIGURE 5, rather than a loop, which in some cases makes it easier to quickly remove the horizontally mounted pole from the apparatus. Accordingly, the forms of the present invention which are described herein and depicted in the accompanying drawings, are only intended to be illustrative, and are not intended as limitations on what is sought to be disclosed and claimed hereby.

What is claimed is:

1. Apparatus for supporting an unattended fishing rod, said apparatus comprising
   an angular shaped vertical support member having one beveled end adapted to be driven into the surface of the earth and having another beveled end forming a notch,
   a horizontal support member perpendicularly attached at one end to said vertical support member, and
   a retaining member perpendicularly attached at one end to the other end of said horizontal support member and having its other end in substantial alignment with the said beveled end of said vertical support member forming a notch.

2. Apparatus as described in claim 1, wherein said horizontal support member includes provision adjacent said vertical support member for retaining a fishing pole in substantial alignment with said vertical support member.

3. Apparatus as described in claim 2, wherein said horizontal support member is composed of a first pair of strap members joined together at their respective ends and spaced apart at a section which is spaced from but relatively near said vertical support member.

4. Apparatus as described in claim 3, wherein said horizontal support member further includes a first lateral brace member between said first pair of strap members in said spaced-apart section.

5. Apparatus as described in claim 2, wherein the end of said retaining member which is in substantial alignment with said notch is formed in the manner of a loop.

6. Apparatus as described in claim 2, wherein the end of said retaining member which is in substantial alignment with said notch is formed in the manner of a hook.

7. Apparatus as described in claim 5, wherein the end of said retaining member which is in substantial alignment with said notch is formed in the manner of a loop, and including an angle brace mounted at one end to the vertical support member near but spaced from said beveled end adapted to be driven into the earth and mounted at the other end to said retaining member near said loop.

8. Apparatus as described in claim 7, wherein said angle brace is formed of a second pair of strap members joined together at their respective ends by said retaining member and said vertical support member and spaced apart at a section spaced from but relatively near said vertical support member.

9. Apparatus as described in claim 8, wherein said angle brace further includes a second lateral brace member between said second pair of strap members in said spaced-apart section.

References Cited by the Examiner

UNITED STATES PATENTS

| 2,416,828 | 3/1947 | Hamre | 248—42 |
| 2,502,272 | 3/1950 | Patton | 248—42 |
| 2,617,616 | 11/1952 | Lavender | 248—42 |
| 2,787,431 | 4/1957 | Smith | 248—42 |
| 2,828,096 | 3/1958 | Beri | 248—40 |

CLAUDE A. LE ROY, *Primary Examiner.*